No. 895,957. PATENTED AUG. 11, 1908.
B. CANELL.
EQUALIZING TRIPLE PRESSURE RETAINING MECHANISM.
APPLICATION FILED OCT. 12, 1907.

Witnesses:
H. L. Sprague
H. W. Bowen

Inventor,
Benjamin Canell
by Chapin & Co
Attorneys.

UNITED STATES PATENT OFFICE.

BENJAMIN CANELL, OF WEST SPRINGFIELD, MASSACHUSETTS.

EQUALIZING TRIPLE-PRESSURE-RETAINING MECHANISM.

No. 895,957.　　　　Specification of Letters Patent.　　　　Patented Aug. 11, 1908.

Application filed October 12, 1907. Serial No. 397,065.

*To all whom it may concern:*

Be it known that I, BENJAMIN CANELL, a citizen of the United States of America, residing at West Springfield, in the county of Hampden and State of Massachusetts, have invented new and useful Improvements in Equalizing Triple-Pressure-Retaining Mechanism, of which the following is a specification.

This invention relates to improvements in fluid pressure air-brakes, its object being to provide a mechanism that will retain the air in the brake cylinder and at the same time permit the auxiliary reservoir to be recharged with the brakes on, thereby effecting a saving in the amount of air used for braking the train and at the same time preventing a train from getting beyond the control of the engineer.

A further object of the device is to permit the attachment of my improvement to the systems now in use, particularly the Westinghouse or New York air-brake systems; a further object lying in the equalization of the air from the auxiliary reservoir to the train line, thereby doing away with the overcharge of the train line and brakes creeping on when the cars are cut from the engine.

Figure 1:
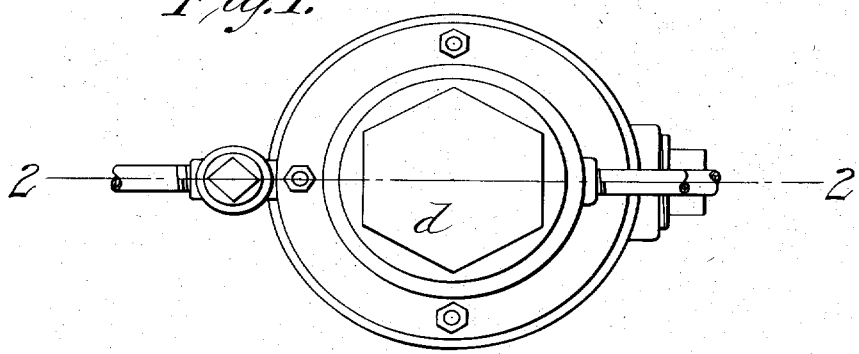
Figure 2:
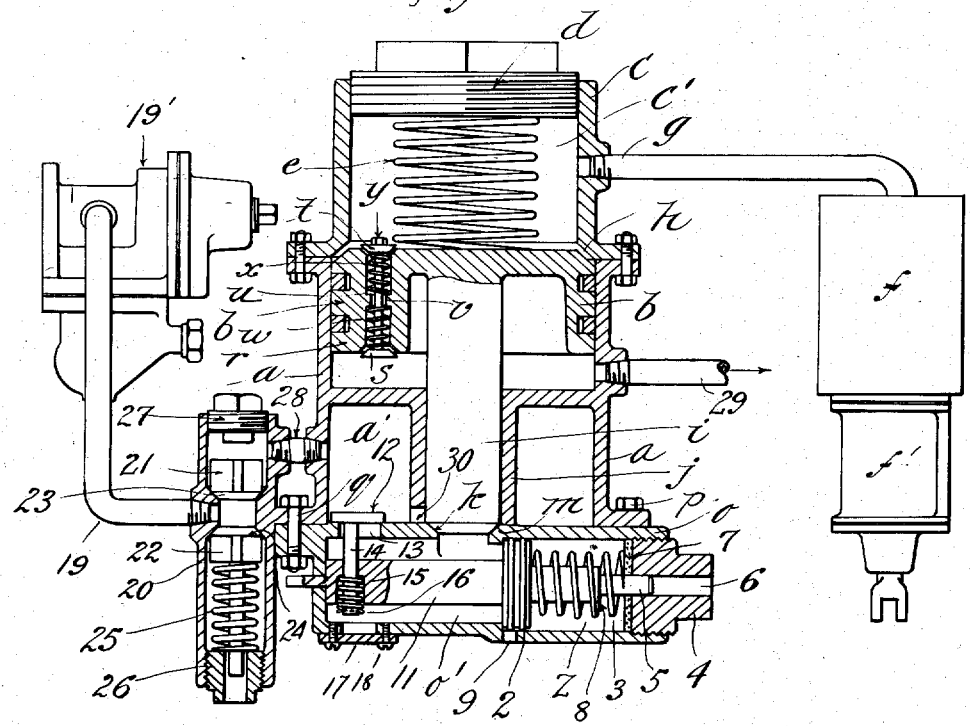

In the drawings forming part of this application,—Figure 1 is a top plan view of my improvement, and Fig. 2 is a vertical section on the line 2—2 of Fig. 1.

Referring to these drawings in detail, $a$ designates the main casing of my improvement in which the piston $b$ is mounted for reciprocation therein. Bolted to the casing $a$ is an extension piece $c$ in the upper end of which is located a threaded plug $d$ which engages a spring $e$ that is normally placed under a tension of five pounds or more to the square inch.

$f$ designates the usual auxiliary cylinder that is connected with the interior of the extension piece $c$ by means of the pipe $g$.

$f^1$ designates the usual brake cylinder.

$h$ designates a bearing or seat for the piston $b$ when in an elevated position. This piston is provided with a cylindrical depending stem $i$ that is mounted in the hub or boss element $j$ of the casing $a$, and which is so constructed as to have a sliding fit within the boss element $j$. The lower end of the stem element is formed into a valve with the conical sides $k$ that engage the seat portion $m$ of the cylindrical part $o$ that is suitably bolted to the main cylinder or casing $a$ by means of the bolts $p$ and $q$.

Mounted within the enlarged portion $r$ of the piston $b$ are two valves $s$ and $t$ which are secured to a stem $u$ that passes through an opening $v$ in the enlarged portion $r$. The valves $s$ and $t$ serve to close the passage-way through the piston $b$. Suitable tension springs $w$ and $x$ are provided for the valves $s$ and $t$, which bear at their inner ends on the shoulder portion of the opening $v$. A nut $y$ is threaded onto the upper end of the stem $u$ for locking the valves $s$ and $t$ to the stem.

The cylindrical part $o$ has a bored out portion $z$ in which is mounted a piston 2 that is normally pressed towards the left by means of the spring 3, suitable tension being placed thereon by means of a plug 4 that is threaded into the end of the part $o$; a stem 5 being attached to the piston 2 and mounted for reciprocation in the opening 6 of the plug 4. The inner face of the plug is provided with a washer or packing 7 against which the shoulder 8 of the stem 5 strikes when moved toward the right. 9 designates a port or opening communicating with the interior of the bored out part $z$. 11 designates an arm secured to the opposite side of the piston 2 for the purpose of supporting the valve 12 in its outer end. This valve is designed to cover a port 13. The stem 14 of the valve 12 is mounted in the arm 11 and is normally drawn downward to its seat by means of the spring 15 and cotter-pin 16.

17 designates a plate that is mounted in the cylindrical part $o$ opposite the end of the stem 14 and is held in place by means of the screws 18. The object of this plate is for the purpose of placing the spring 15, and cotter-pin 16 on the stem 14 and into the opening of the arm 11.

19 designates a pipe that leads from the exhaust port of the triple valve 19[1] and communicates with the interior of the casing 20 which is cast integral with the main casing $a$.

Mounted within the casing 20 are two valves 21 and 22,—the valve 21 normally engaging the seat 23 by gravity alone; the valve 22, however, is held in contact with the seat 24 by means of the coiled spring 25 which is forced upwardly by means of the plug 26. A plug 27 is used to close the upper end of the casing 20. A pipe 28 connects the interior of the casing 20 with the interior of the casing $a$.

29 designates a pipe that extends the length of the train and serves to supply air to the auxiliary reservoir from the main reservoir on the engine, and under the control of the engineer, which is the usual practice.

Referring to the operation of my invention: The pressure in the auxiliary cylinder $f$ and the train-pipe 29 is, under running conditions, practically 70 lbs., to the square inch, but when an application of the brakes is made in the usual manner by reducing the pressure in the train-pipe (which is generally a five pound reduction,) it permits the air to flow from the auxiliary cylinder $f$ to the brake cylinder $f^1$. Since the pressure in the auxiliary cylinder $f$ is reduced to 65 lbs., it will serve to hold the piston $b$ downward, because the air that passes through the pipe $g$ being 65 lbs., and the tension of the spring $e$ being 5 lbs., or more, the two pressures will together make 70 lbs. When the engineer brings his valve back into running position bringing the pressure in the train-pipe up to 70 lbs., by means of the reducing valve on the engineer's valve, it will not cause the piston $b$ to move from its seat $m$, and as a result of this operation the triple valve is moved into release position, but the air can not escape through the port 30 since the same is closed by means of the valve-stem $i$, thereby preventing any flow of air from the exhaust port of the triple valve to escape to the atmosphere through the exhaust-pipe 19, valve 21, through pipe 28 into the chamber $a^1$ through the port 30 into the chamber $o^1$ operating the piston 2, whereby the port 9 connected to the atmosphere is closed. After every application, the engineer will always have 70 lbs. of air to brake with, if he so desires.

Referring now to the operation of the valves $s$ and $t$, and what I term equalizing valves: Their use does away with the ordinary leakage groove in the brake cylinder, thus preventing the application of the brakes from taking place automatically when the car is cut off from the train. The brakemen are not obliged, as usual, to "bleed" the cars before "kicking them off" from the train, as it is termed. In the operation of the valves $s$ and $t$ and the employment of the weak springs $x$ and $w$ to maintain both valves $s$ and $t$ open, and normally having a leakage groove around in the stem, I provide for any leak in the train line that may occur, that is to say the air would pass from the auxiliary cylinder $f$ to the train line; but a sudden application of pressure on either side of the valves $s$ and $t$ would close these valves from either side, since the leakage grooves around the stem $v$ would not carry such a large volume of air.

In the operation of the valves 21 and 22,—the valve 21 being a check-valve permits air to pass from the exhaust-port of the triple valve allowing the air to pass through the pipe 28 into the chamber $a^1$ of the casing $a$, but it can go no farther since the stem $i$ and valve 12 are normally closed. This valve 21 also prevents any leakage of air that might escape by the piston-stem $i$ into the exhaust-pipe 19 which is attached to the exhaust-port of the triple valve $19^1$ and might interfere with the proper workings of the same and apply the brakes. The excess pressure valve 22 is slidably mounted in the casing 20 and provided with a graduating spring 25. When the passage of the air in the brake cylinder $f^1$ is more than the car is designed to take in order to apply the proper leverage, this spring 25, being graduated to any suitable pressure, would allow any excess pressure in the brake cylinder to escape to the atmosphere.

Referring now to the operation of the piston 2 in the casing $o$ in releasing the brakes by throwing the main pressure into the train pipe 29 and causing this superior pressure on the under side of the piston $b$, thereby lifting the same against its seat $h$ and unseating at $k$ and opening the port 30, thus allowing the confined air in the chamber $a^1$ and its communicating pipes to pass from the exhaust port of the triple valve and pass through the port 30 into the chamber $o^1$, moving the piston 2 towards the right and carrying with it the slide valve 12. This operation uncovers the port 9, also opening the port 13 and thus allowing the air to pass into the atmosphere through the port 9, thereby releasing the brakes.

Referring now to the object and use of the valve 12: When an application of the brakes is made, the pressures in the auxiliary reservoir and train-pipe line sometimes become equal to each other. This equalization of the pressures frequently occurs before the brakes are fully released, and on account of the pressures on both sides of the piston $b$ becoming equal, the stem $i$ will close the port 30 and shut off the flow of the exhaust air from the chamber $a^1$ to the atmosphere. The piston-head 2 will, however, remain in a position at the right hand end of the casing $o$ because the spring 3 is of weak tension, and therefore it will hold the valve 12 so as to uncover the port 13. The exhaust air in the chamber $a^1$ then freely escapes through the port 9 to the atmosphere until the brakes are fully released. When this condition occurs the spring 3 will move the slide valve 12 back again and cover the port 13 so that another application of the brakes can be made whenever necessary.

What I claim, is:—

1. In combination with the train-pipe, brake cylinder, auxiliary reservoir, and triple valve of a fluid pressure brake mechanism, a cylinder, a piston therein, a second cylinder attached to said cylinder and in communication therewith, the piston being provided with a stem element for closing a port in the first mentioned cylinder, a pipe connection between the exhaust port of the triple valve and said port, whereby when the first mentioned port is closed, the auxiliary reservoir can be repeatedly charged without the loss of air from the brake cylinder.

2. A fluid pressure brake mechanism having in combination with the ordinary train pipe, auxiliary reservoir, brake cylinder, and triple valve, a main cylinder, a piston therein, a second cylinder attached to said cylinder, a spring therein bearing on the piston, means for adjusting the tension of the spring, a pipe connection between the second cylinder and the brake cylinder and above the piston in the main cylinder, the piston being provided with a stem portion for normally closing a port in the main cylinder and between the exhaust opening of the triple valve and the atmosphere, the train pipe being connected to the main cylinder and below the piston therein whereby, when an application of the brakes is made air is retained in the brake cylinder and the auxiliary reservoir can be repeatedly recharged, and whereby when the brakes are to be released the piston and its stem will be elevated and the exhaust port of the triple valve placed in communication with the atmosphere, as described.

3. In a fluid pressure brake mechanism, a main cylinder, a piston therein, equalizing valves located in the body portion of the piston and normally affording a by-pass for the air to either side of the same, the piston having communicating means on opposite sides thereof with the auxiliary reservoir and train-pipe respectively, whereby the pressures above and below the same are normally equalized, and whereby when a sudden pressure is made either above or below the piston the equalizing valve on that side of the piston will close and permit an application or release of the brakes, as described.

4. A fluid pressure brake mechanism having in combination, a main cylinder, a piston therein and provided with a stem for normally closing a port in the main cylinder which connects with the exhaust port of the triple valve, a casing secured to the main casing, a piston mounted therein, a valve carried by the last-named piston and normally closing a communication leading from the main cylinder and casing, a spring for normally holding the piston so as to close said communication, whereby when a release of the brakes is made, the stem will be elevated, and the ports between the exhaust port of the triple valve and atmosphere will be opened.

5. In combination, a main casing, a piston therein, a stem carried by the piston and normally closing a port in the casing, the train-pipe being connected below the piston, a check-valve located between the stem and the exhaust opening of the triple valve, whereby any leakage from the train pipe to the triple valve is prevented.

6. In combination, a main cylinder, a second cylinder connected thereto, an excess pressure valve located adjacent the exhaust-port of the triple-valve, whereby when an excess pressure in the brake cylinder occurs, the valve will open communication to the atmosphere, as described.

7. In combination, a main cylinder, a piston therein, a stem carried thereby, a spring for holding the piston downward, the train-pipe and air reservoir being connected above and below the piston, the stem normally closing communication between the exhaust port of the triple-valve and the atmosphere; a casing connected to the main cylinder, a piston therein normally closing an atmospheric opening in the walls thereof, a valve operated from the last named piston, said valve serving to maintain the atmospheric opening controlled thereby open until the brakes have been fully released, when a superior pressure is applied to the lower side of the piston in the main cylinder, as described.

8. An air-brake mechanism having in combination with the train-pipe, auxiliary reservoir, and triple valve, a cylinder, a piston therein, a second cylinder provided with an atmospheric opening, a piston for controlling said opening, and means carried by the piston for controlling the movements of said second piston, whereby the auxiliary reservoir may be charged with the brakes on.

BENJAMIN CANELL.

Witnesses:
K. I. CLEMONS,
HARRY W. BOWEN.

It is hereby certified that in Letters Patent No. 895,957, granted August 11, 1908, upon the application of Benjamin Canell, of West Springfield, Massachusetts, for an improvement in "Equalizing Triple-Pressure-Retaining Mechanism," an error appears requiring correction, as follows: At the heading of the drawing, the number of the patent "805,957" should read *895,957;* and that the said drawing should be read with this correction therein that the same may conform to the record of the case in the Patent Office.

Signed and sealed this 10th day of November, A. D., 1908.

[SEAL.]

C. C. BILLINGS,

*Acting Commissioner of Patents.* cation therewith, the piston being provided with a stem element for closing a port in the first mentioned cylinder, a pipe connection between the exhaust port of the triple valve and said port, whereby when the first mentioned port is closed, the auxiliary reservoir can be repeatedly charged without the loss of air from the brake cylinder.

2. A fluid pressure brake mechanism having in combination with the ordinary train pipe, auxiliary reservoir, brake cylinder, and triple valve, a main cylinder, a piston therein, a second cylinder attached to said cylinder, a spring therein bearing on the piston, means for adjusting the tension of the spring, a pipe connection between the second cylinder and the brake cylinder and above the piston in the main cylinder, the piston being provided with a stem portion for normally closing a port in the main cylinder and between the exhaust opening of the triple valve and the atmosphere, the train pipe being connected to the main cylinder and below the piston therein whereby, when an application of the brakes is made air is retained in the brake cylinder and the auxiliary reservoir can be repeatedly recharged, and whereby when the brakes are to be released the piston and its stem will be elevated and the exhaust port of the triple valve placed in communication with the atmosphere, as described.

3. In a fluid pressure brake mechanism, a main cylinder, a piston therein, equalizing valves located in the body portion of the piston and normally affording a by-pass for the air to either side of the same, the piston having communicating means on opposite sides thereof with the auxiliary reservoir and train-pipe respectively, whereby the pressures above and below the same are normally equalized, and whereby when a sudden pressure is made either above or below the piston the equalizing valve on that side of the piston will close and permit an application or release of the brakes, as described.

4. A fluid pressure brake mechanism having in combination, a main cylinder, a piston therein and provided with a stem for normally closing a port in the main cylinder which connects with the exhaust port of the triple valve, a casing secured to the main casing, a piston mounted therein, a valve carried by the last-named piston and normally closing a communication leading from the main cylinder and casing, a spring for normally holding the piston so as to close said communication, whereby when a release of the brakes is made, the stem will be elevated, and the ports between the exhaust port of the triple valve and atmosphere will be opened.

5. In combination, a main casing, a piston therein, a stem carried by the piston and normally closing a port in the casing, the train-pipe being connected below the piston, a check-valve located between the stem and the exhaust opening of the triple valve, whereby any leakage from the train pipe to the triple valve is prevented.

6. In combination, a main cylinder, a second cylinder connected thereto, an excess pressure valve located adjacent the exhaust-port of the triple-valve, whereby when an excess pressure in the brake cylinder occurs, the valve will open communication to the atmosphere, as described.

7. In combination, a main cylinder, a piston therein, a stem carried thereby, a spring for holding the piston downward, the train-pipe and air reservoir being connected above and below the piston, the stem normally closing communication between the exhaust port of the triple-valve and the atmosphere; a casing connected to the main cylinder, a piston therein normally closing an atmospheric opening in the walls thereof, a valve operated from the last named piston, said valve serving to maintain the atmospheric opening controlled thereby open until the brakes have been fully released, when a superior pressure is applied to the lower side of the piston in the main cylinder, as described.

8. An air-brake mechanism having in combination with the train-pipe, auxiliary reservoir, and triple valve, a cylinder, a piston therein, a second cylinder provided with an atmospheric opening, a piston for controlling said opening, and means carried by the piston for controlling the movements of said second piston, whereby the auxiliary reservoir may be charged with the brakes on.

BENJAMIN CANELL.

Witnesses:
K. I. CLEMONS,
HARRY W. BOWEN.

It is hereby certified that in Letters Patent No. 895,957, granted August 11, 1908, upon the application of Benjamin Canell, of West Springfield, Massachusetts, for an improvement in "Equalizing Triple-Pressure-Retaining Mechanism," an error appears requiring correction, as follows: At the heading of the drawing, the number of the patent "805,957" should read *895,957;* and that the said drawing should be read with this correction therein that the same may conform to the record of the case in the Patent Office.

Signed and sealed this 10th day of November, A. D., 1908.

[SEAL.]

C. C. BILLINGS,
*Acting Commissioner of Patents.*

It is hereby certified that in Letters Patent No. 895,957, granted August 11, 1908, upon the application of Benjamin Canell, of West Springfield, Massachusetts, for an improvement in "Equalizing Triple-Pressure-Retaining Mechanism," an error appears requiring correction, as follows: At the heading of the drawing, the number of the patent "805,957" should read *895,957;* and that the said drawing should be read with this correction therein that the same may conform to the record of the case in the Patent Office.

Signed and sealed this 10th day of November, A. D., 1908.

[SEAL.]

C. C. BILLINGS,

*Acting Commissioner of Patents.*